United States Patent
Guha et al.

(10) Patent No.: US 7,655,297 B2
(45) Date of Patent: Feb. 2, 2010

(54) ELECTRICALLY CONDUCTIVE POLYESTER MOLDING COMPOSITION HAVING A HIGH QUALITY SURFACE FINISH

(75) Inventors: Probir K. Guha, Troy, MI (US); Michael J. Siwajek, Rochester Hills, MI (US)

(73) Assignee: Continental Structural Plastics, Troy, MI (US)

( * ) Notice: Subject to any disclaimer, the term of this patent is extended or adjusted under 35 U.S.C. 154(b) by 0 days.

(21) Appl. No.: 11/875,400

(22) Filed: Oct. 19, 2007

(65) Prior Publication Data

US 2008/0096032 A1    Apr. 24, 2008

Related U.S. Application Data

(60) Provisional application No. 60/862,127, filed on Oct. 19, 2006.

(51) Int. Cl.
*H01B 1/24* (2006.01)
*B32B 5/16* (2006.01)

(52) U.S. Cl. .............. 428/323; 252/502; 252/511

(58) Field of Classification Search .......... 428/511, 428/840.3, 323; 264/496; 523/205, 215, 523/217, 439; 252/511, 502
See application file for complete search history.

(56) References Cited

U.S. PATENT DOCUMENTS 7,026,432 B2 *   4/2006   Charati et al. .............. 528/271
7,122,585 B2 *  10/2006   Nicholl et al. ............. 523/205
2003/0096123 A1 *  5/2003   Yeager ...................... 428/461
2004/0175593 A1 *  9/2004   Davis et al. ................ 428/515
2006/0173142 A1 *  8/2006   Nava et al. ................. 525/540

OTHER PUBLICATIONS

Salamone, Joseph "Polymeric Materials Encylopedia" 1996, p. 8488.*

* cited by examiner

*Primary Examiner*—Timothy M Speer
*Assistant Examiner*—Lauren Robinson
(74) *Attorney, Agent, or Firm*—Gifford, Krass, Sprinkle, Anderson & Citkowski, P.C.

(57) ABSTRACT

A molding compound formulation is provided that includes a unsaturated polyester, a low profile additive, and high surface area conductive carbon black particulate. The carbon black is dispersed in at least one of the unsaturated polyester and the low profile additive to produce a cured panel having a surface resistivity value of between $1 \times 10^5 - 10^8 \Omega$, and a Diffracto analysis D number of less than 100 when cured against a mold platen having a Diffracto analysis D number of 25. A process for producing such a molding compound panel is also provided that includes mixing through rotary mechanical stirring the high surface area conductive carbon black particulate into one side of the molding compound formulation under conditions that satisfy:

$$\ln(\text{viscosity}) \leq -0.82\{\ln(\text{RPM})\} + 12.734 \qquad (I)$$

where viscosity is in Centipoise and RPM denotes revolutions per minute.

9 Claims, 1 Drawing Sheet

ELECTRICALLY CONDUCTIVE POLYESTER MOLDING COMPOSITION HAVING A HIGH QUALITY SURFACE FINISH

RELATED APPLICATIONS

This application is a non-provisional application that claims priority benefit of U.S. Provisional Application Ser. No. 60/862,127 filed Oct. 19, 2007; the contents of which are hereby incorporated by reference.

FIELD OF THE INVENTION

The present invention in general relates to electrically conductive polyester molding compound and methods of forming the same and in particular to dispersion of conducting particulate in the curable unsaturated polyester resin component of a molding compound and segregating the resin component from low profile additives of an A side so as to enhance uniform paint coating receipt to achieve a surface finish suitable for automotive skin panels.

BACKGROUND OF THE INVENTION

Electrostatic painting of various vehicle components presents an attractive and cost effective scheme as compared to usage of a conventional paint line. Electrostatic painting of vehicle parts, such as doors, hoods, quarter panels, and other vehicle skin parts can be routinely performed. Owing to the high visibility and environmental exposure encountered by such vehicle parts, a high quality paint finish surface is demanded that is commonly referred to in the industry as a Class A finish associated with a high degree of reflectivity and a surface free of visual defects. Electrostatic painting requires the part to be electrically conductive and support an electrical potential on the part needed to attract oppositely charged paint aerosol droplets to the part. Early attempts at producing inexpensive molding compound components amenable to electrostatic painting involved the application of an electrically conductive primer. With the primer application adding considerable cost and the primer application defects being manifest in the resulting painted article. As a result, these previous attempts to make sheet molding compound conductive articles were relegated to vehicle portions other than the vehicle skin, such as radiator brackets and wheel wells.

The development of an inherently conductive sheet molding compound obviates the need for the application of a conductive primer coat. Such a conductive sheet molding compound (SMC) is detailed in U.S. Pat. No. 6,001,919. As tolerances for the acceptable amount of SMC article shrinkage relative to mold specifications decreases, as well as increased demands as painted surface finish attributes, low profile additives are increasingly found in SMC. Representative of these high-performance SMC formulations inclusive of low profile additives are those current marketed by Continental Structural Plastics under the trade name TCA. The inclusion of low profile additives is compatible with a conductive particulate to render an SMC article amenable to electrostatic painting, however, the inclusion of loadings of conductive particulate necessary to make an article sufficiently conductive, modifies the flow properties of the molding compound resins, leading to inhomogeneous molded articles, degrades the surface finish, and the higher viscosity forces molding filling conditions that degrade the conductivity of a given volume of conductive filler.

Thus, there exists a need for a molding compound composition that is conductive to provide a high quality paint finish provided through electrostatic painting that has handling properties allowing mold filling without damaging the delicate structure of high surface area conductive particles.

SUMMARY OF THE INVENTION

A molding compound formulation is provided that includes a thermoset cross-linkable unsaturated polyester, a low profile additive, and an amount of between 0.3 and 3 weight percent of the formulation exclusive of fiber filler of high surface area conductive carbon black particulate. The carbon black is dispersed in at least one of the unsaturated polyester and the low profile additive to produce a cured panel having a surface resistivity value of between $1\times10^5\Omega$ and $1\times10^8\Omega$, and a Diffracto analysis D number of less than 100 when cured against a mold platen having a Diffracto analysis D number of 25. A process for producing such a molding compound panel includes mixing through rotary mechanical stirring the high surface area conductive carbon black particulate into one side of the molding compound formulation under conditions that satisfy:

$$\ln(\text{viscosity}) \leq -0.82\{\ln(\text{RPM})\} + 12.734 \qquad (I)$$

where viscosity is in Centipoise and RPM denotes revolutions per minute. Upon combining the side with other sides of the molding compound formulation and fiber filler, a fully formulated molding compound is obtained. Flowing the fully formulated molding compound having a molding viscosity, of between 30 and 50 million Centipoise is especially desirous, into the panel mold and curing the unsaturated polyester yields the panel having a surface resistivity of less than $1\times10^8\Omega$ and a Diffracto analysis D number of less than 100 when the mold platen having a Diffracto analysis D number of 25. The resulting panel is amenable to direct electrostatic painting without resort to a conductive priming step to achieve a class A surface finish.

DETAILED DESCRIPTION OF THE PREFERRED EMBODIMENTS

Figure 1:
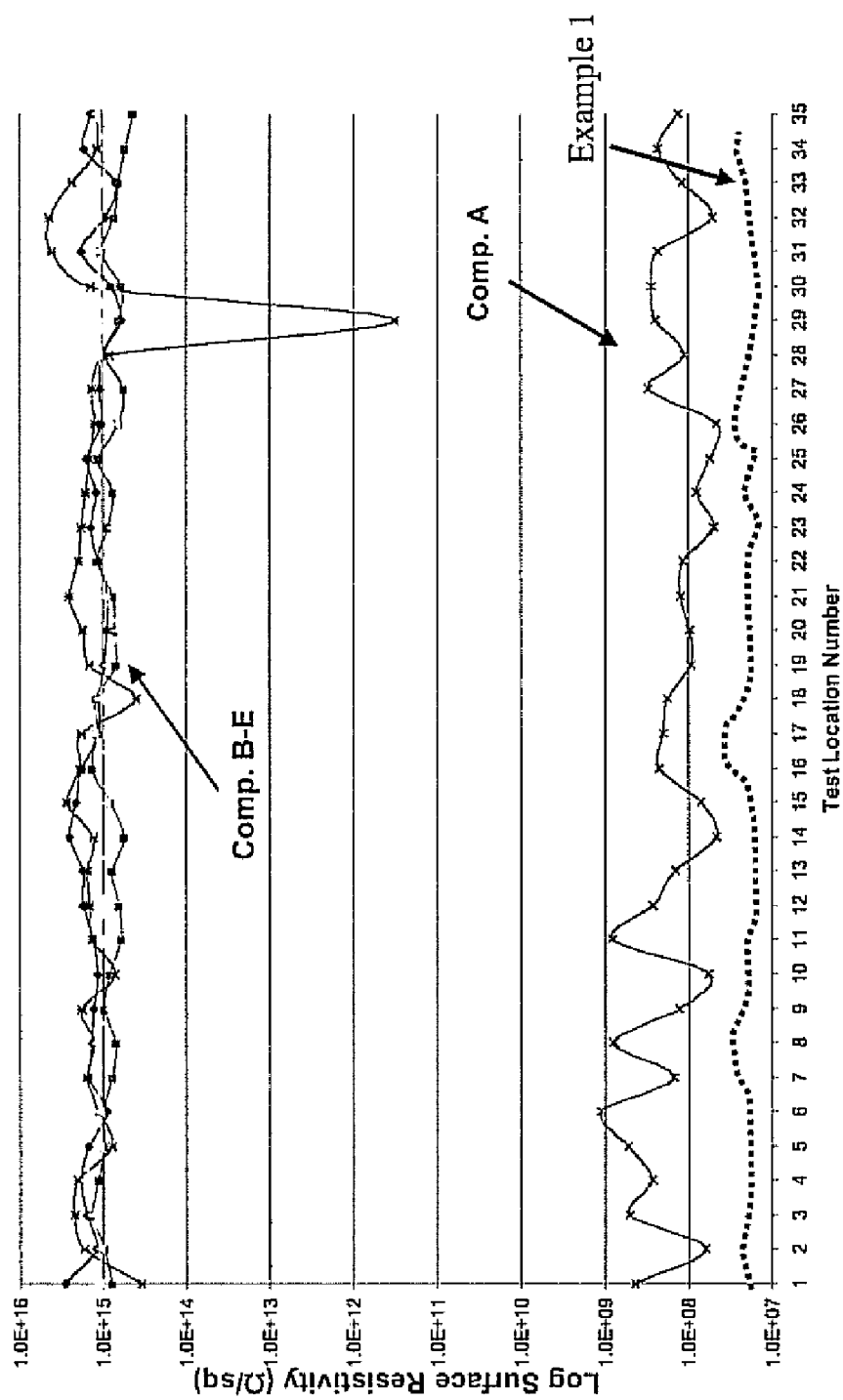
FIG. 1 is a log plot of surface resistivity in Ohms of a vehicle panel as a function of location for an inventive formulation (dashed line), as well as a comparative example (x) per U.S. Pat. No. 6,001,919 with 0.80 total weight percent carbon black; and unsuccessful inventive variant formulations (♦) 0.52, (*) 0.60, (■) 0.39, and (▲) 0.45 total weight percent conductive carbon black.

The present invention has utility as a conductive molding compound amenable to receiving a highly uniform paint coating via electrostatic painting technique. Incorporation of high surface area conductive carbon black particulate according to the present invention provides a lower surface resistivity and more uniform electrostatic potential on the surface of the resultant panel molded from an inventive molding compound, as well as providing a Diffracto analysis D number of less than 100 when the panel is cured against a mold platen having a surface with a Diffracto analysis D number of 25.

As used herein, "molding compound" refers to both sheet molding compound (SMC) and bulk molding compound (BMC).

As used herein, "panel" refers to planar and three dimensionally contours articles and especially those formed as vehicle skin parts.

The present invention achieves superior paint finish properties to a panel molded from a conductive molding compound through the recognition that controlling the viscosity of molding compound components is essential to retain the conductivity properties of high surface area conductive carbon black particulate. Accordingly the distribution of high surface area conductive carbon black particulate occurs within a molding compound portion such that the mixing into that portion satisfies the expression (I)

$$\ln(\text{viscosity}) \leq -0.82\{\ln(\text{RPM})\} + 12.734 \quad (I)$$

where viscosity is in Centipoise and RPM denotes revolutions per minute of the component side to which the high surface area conductive carbon black particulate is added. To assure the radiative structures of the high surface area conductive carbon black particulate are maintained a fully formulated molding compound has a molding viscosity in the range of 30 to 50 million Centipoise.

In a preferred embodiment, the high surface area conductive carbon black particulate is dispersed in liquid unsaturated polyester resin of a molding compound that is segregating from the resin A side components of the molding compound to avoid exceeding the conditions of expression (I). It is appreciated that high surface area conductive carbon black particulate is added to other components of a molding compound other than or in combination with the unsaturated polyester resin so long a expression (I) is satisfied and the molding viscosity is maintained in the range of 30 to 50 million Centipoise. Representative other liquid bases amenable to receiving as a dispersal high surface area conductive carbon black particulate low profile additive and unsaturated monomer components. As used herein, "the total weight percent" is intended to define a fully loaded molding compound inclusive of fillers and fibers.

As used herein, "unsaturated" refers to covalent bond attachment to the carbon atoms of a carbon-carbon bond being less than a maximal complement of bonding carbon or hydrogen atoms, namely the carbon-carbon bond is a double or triple bond.

A base conductive SMC formulation that benefits from incorporation of conductive particulate into the low profile additive phase includes a wide variety of thermoset, and thermoplastic SMC components. While a variety of base SMC formulations are known such as those described in U.S. Pat. Nos. 4,260,538; 4,643,126; 5,100,935; 5,268,400; 5,854,317; 6,001,919; and 6,780,923; and all of these formulation benefit from the inventive process of high surface area conductive carbon black particulate dispersion, a new formulation is required to attain the maximal benefits of the present invention as to molded panel conductivity and surface finish. The typical amounts of components in an inventive composition are provided below in Table 1; however, to achieve a satisfactory degree of low surface resistivity of less than or equal to $1 \times 10^9$ Ohms ($\Omega$/sq) and preferably between $1 \times 10^5$ $\Omega$/sq and $1 \times 10^8$ $\Omega$/sq simultaneous with a surface finish to a molded panel having Diffracto analysis D number of less than 100 when the panel is cured against a mold platen having a surface with a Diffracto analysis D number of 25, dispersing the high surface area conductive carbon black particulate dispersion must satisfy expression (I) and yield a molding viscosity of between 30 and 50 million Centipoise. This is accomplished with a quantities of carbon black of between 0.3 and 3 composition weight percent exclusive of fiber filler and preferably with between 0.4 and 1 composition weight percent exclusive of fiber filler. Accordingly, Table 2 shows the segregation of components between A, B, C, and D sides to achieve a high performance molding compound.

It has been surprisingly found that the required degree of surface resistance in an automotive skin panel is dependent more on the shear forces that high surface area conductive carbon black particulate dispersion is exposed to during molding compound mixing and molding as compared to total quantity of the high surface area conductive carbon black particulate dispersion present. Without intending to be bound by a particular theory, damage to the dendritic and other structures extending from high surface area conductive carbon black particulate lessens the effective electrically conductivity diameter of a particle thereby increasing the effective separation distance between such high surface area conductive carbon black particles.

TABLE 1

Components as Percentages of Fully Formulated Inventive Molding compound

| | Typical Total Weight Percent | Preferred Total Weight Percent |
|---|---|---|
| Reactants | | |
| Cross-linkable unsaturated polyester prepolymer | 6-60 | 8-40 |
| Ethylenically unsaturated monomer (e.g. styrene) | 4-50 | 6-30 |
| Reaction Kinetic Modifiers | | |
| Free radical initiation (e.g. peroxide/peroxy ketals, or azo cmpds) | 0-3 | 0.1-1 |
| Polymerization inhibitor (e.g. hydroquinone) | 0-2 | 0.1-1 |
| Additives | | |
| Mold release (e.g. stearate additive) | 0-5 | 0.2-1 |
| Plasticizer | 0-3 | 0.1-0.5 |
| Flame retardant | 0-3 | 0.1-0.7 |
| Thickeners | 0-5 | 0.5-2.5 |
| Colorants | 0-3 | 0.1-1 |
| Fillers | | |
| Particulate filler (e.g. calcium carbonate or alumina) | 0-80 | 15-50 |
| Fiber fillers (e.g. glass) | 0-80 | 5-60 |
| high surface area conductive carbon black particulate dispersion | 0.3-1.4 | 0.4-0.8 |
| Low Profile Additives (LPA) | | |
| Total amount | 4-40 | 5-20 |
| Ethyleneically saturated polyester | 0-20 | 2-15 |
| Polyvinyl acetate (PVAc) | 0-20 | 1-4 |
| Copolymers of polyvinyl acetate | | |
| Styrene Butadiene rubber | 0-20 | 1-4 |
| Polystyrene | 0-20 | 1-4 |
| Polymethylmethacrylate (PMMA) | 0-20 | 0-4 |

TABLE 2

Distribution of conductive particulate among MC composition components in parts per hundred with the exception of fiber filler

| | Typical parts per hundred (phr) | Preferred phr |
|---|---|---|
| A side | | |
| Saturated polyester (LPA) | 5-50 | 20-40 |
| Ethylenically unsaturated monomer (e.g. styrene, divinyl benzene, etc.) | 2-25 | 3-15 |
| Stryene butadiene rubber (LPA) | 0-15 | 2-8 |
| Polystyrene (LPA) | 0-15 | 2-8 |

TABLE 2-continued

Distribution of conductive particulate among MC composition components in parts per hundred with the exception of fiber filler

| | Typical parts per hundred (phr) | Preferred phr |
|---|---|---|
| PVAc (LPA) | 0-15 | 1-6 |
| PMMA (LPA) | 0-15 | 1-6 |
| Free radical initiation (e.g. peroxide/peroxy ketals, or azo cmpds) | 0.1-2.0 | 0.5-1.5 |
| Polymerization inhibitor (e.g. hydroquinone) | 0.1-2.0 | 0.5-1.5 |
| Mold release (e.g. stearate additive) | 0-5 | 0.5-2.5 |
| Flame retardant | 0-5 | 0.5-2.5 |
| Colorants | 0-5 | 0.5-2.5 |
| Particulate filler (e.g. calcium carbonate or alumina) | 0-350 | 100-250 |
| B side | | |
| saturated polyester + (alkali earth oxide or hydroxide thickener) | 1-15 (0.1-3) | 3-10 (0.5-1.5) |
| C side | | |
| Isocyanate terminated polyurethane | 0-20 | 2-14 |
| D side | | |
| Curable ethylenically unsaturated polyester resin | 30-140 | 40-120 |
| unsaturated monomer | 0.5-20 | 1-15 |
| High Surface area carbon (dispersed in resin) | 0.8-13.0 | 1.4-4.0 |
| Fiber reinforcement | | |
| Fiber fillers (e.g. glass) | 0-40 total wt percent | 25-35 SMC 5-40 BMC |

A principal component of a mold compound formulation is an unsaturated polyester resin cross-linkable polymer resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or poly-acids are also part of the condensation process to form polyester prepolymers with a lesser equivalency of reactive ethylenic unsaturation sites. Unsaturated polyester resins disclosed in U.S. Pat. No. 6,780,923 are preferred for use with the present invention, however these polyester resins in contrast to the prior art are separated, along with an optional portion of viscosity reducing athletically unsaturated monomer to form a side D in which high surface area conductive carbon black particulate is dispersed to satisfy the mechanical mixing requirements of expression (I).

The polymeric resin prepolymer is suspended, and preferably dissolved, in an ethylenically unsaturated monomer that copolymerizes with the resin during the thermoset process. It is appreciated that more than one type of monomer can be used in a molding compound. The monomer provides benefits including lower prepolymer viscosity and thermosetting without formation of a volatile byproduct. Ethylenically unsaturated monomer operative herein illustratively includes styrene, alpha-methylstyrene, vinyltoluene, chlorostyrene, (meth)acrylic acid, alkyl (methyl)acrylates, acrylonitrile, vinyl acetate, allyl acetate, triallyl cyanurate, triallyl isocyanurate, and acrylamide. Styrene and methyl methacrylate are especially preferred. A normally solid polymerizable monomer such as diacetone acrylamide is optionally used as a solution in one of the above-recited normally liquid polymerizable monomer.

A typical molding compound includes a free radical initiator to initiate cross-linking between the polymeric prepolymer resin with itself or with ethylenically unsaturated monomer, if present. A free radical initiator is typically chosen so as to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent.

The inventive molding compound preferably includes a nonconductive particulate filler. Non-conductive particulate fillers operative in such molding compounds illustratively include calcium carbonate, calcium silicate, alumina, alumina trihydrate (ATH), silica, talcs, dolomite, vermiculite, diatomaceous earth, kaolin clay, and combinations thereof. Factors relevant in the choice of a particulate filler illustratively include filler cost, resultant viscosity of flow properties, resultant shrinkage, surface finish weight, flammability, and chemical resistance of the thermoset formulation. Typical filler sizes are from 0.1 to 50 microns.

A fiber filler is typically added to provide strength relative to a particulate filler. Fiber fillers operative herein illustratively include glass, carbon, polyimides, polyesters, polyamides, and natural fibers such as cotton, silk, and hemp. Preferably, the fiber filler is glass fiber in the form of chopped glass strands. More preferably, chopped glass strands are provided in lengths ranging from 5 to 50 millimeters.

A mold release agent is typically provided to promote mold release. Mold releases include fatty acid salts illustratively including oleates-, palmitates-, stearates- of metal ions such as sodium, zinc, calcium, magnesium, and lithium. A mold release is typically present from 0 to 5 total weight percent.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, and combinations thereof. Copolymers operative as low profile additives include the above-recited polymers in addition to copolymers of the same including butadiene, acrylonitrile, and vinyl chloride and specifically include styrene butadiene rubbers. It is appreciated that the present invention optionally also incorporates additional additives illustratively including flame retardants, plasticizers, colorants, and other processing additives conventional to the art.

For molding compounds of the present invention to be well suited for the rapid production of molded composite articles that have a class "A" finish inclusive of an electrostatic paint coating, a high surface area conductive carbon black particulate is mixed into a single side or multiple side of a compound formulation under conditions that satisfy expression (I) and upon mixing all the side and fiber filler results in a molding viscosity of between 30 and 50 million Centipoise.

According to an inventive process, the total quantity of high surface area conductive carbon black particulate needed for form an electrostatically paintable molding compound panel is determined based on factors such as particle dimensions, intrinsic conductivity, and particle surface area. It is appreciated that high surface area conductive carbon black particulate loadings while essential to the electrostatic properties of the resulting articles tend to increase the viscosity of the fully formulated molding composition and compensating for this viscosity increase by reducing other fillers tends to decrease the physical performance characteristics of the resulting panel.

The high surface area conductive carbon black particulate fillers operative herein have high surface area of greater than 500 meters squared per gram and specifically excludes acetylenic carbon black that common to the art. Illustrative high surface area conductive carbon blacks include Ketjen EC 300J, Ketjen EC 600 J (Akzo Nobel) Black Pearls 2000 (Cabot), Vulcan XC 72R (Cabot), Denlca Black, Denka Black AB 18 (Denko Kogyo) and those disclosed in WO/2007/013678.

The isocyanate terminated urethane is operative as a thickener and becomes covalently bonded to the polyester resin matrix of the polyester resin product. The isocyanate terminated urethane prepolymer of the present invention is made in a one-step process and has an NCO/OH ratio of approximately 1.2/1 to approximately 5/1, and preferably an NCO/OH ratio of 1.8 to 3 and is made by combining one equivalent of a polyol, preferably polyether polyol having a molecular weight of approximately 600 to 4,000 and a functionality of approximately 2 to 6, and preferably 2 to 3, and most preferably 2, with two equivalents of a polyisocyanate and preferably a di-isocyanate and 0 to 1% of any conventional urethane catalyst, such as stannous octoate, dibutyltin dilaurate (and the like). Such isocyanate terminated urethanes are known to the art as exemplified in U.S. Pat. No. 4,535,110.

The present invention is particularly well suited for the production of a variety of panel products illustratively including bumper beams, fenders, vehicle door panel components, automotive floor components, spoilers and hoods; and various industrial and consumer product housings.

The present invention is further detailed with respect to the following non-limiting examples. These examples are not intended to limit the scope of the appended claims.

EXAMPLE 1

To test the properties of the present invention, SMC formulas were prepared by mixing an A-side paste, a filler, a B-side solution, an isocyanate-terminated urethane prepolymer, and 1" chopped glass fiber according to the following recipe: A-side Paste Components (by phr): 26 saturated polyester low profile additive, 1.5 divinylbenzene, 4.5 styrene, 4 styrene butadiene rubber, 3.5 polyvinyl acetate solution polyester, polymethylmetaacrylate, 1.5 viscosity reducer, 1.04 p-benzoquinone inhibitor, 1.5 stearic acid 2.2 catalyst, 2.5 mold release agent, and 200 calcium carbonate filler.

B-side solution (by phr): 5.2 magnesium oxide dispersion (25% by wt.) in saturated polyester.

C-side solution (by phr): 8 isocyanate-terminated urethane

D-side solution (by phr): 70 curable unsaturated polyester, 5 styrene, and containing 1.9 800 square meters per gram of conductive carbon black particulate mixed tlierein with mechanical stirring to maintain the natural log, ln of the viscosity, ln(viscosity)<-0.8193 (ln(RPM) throughout the dispersion process.

27.50% by total weight 1" chopped glass fiber is combined with sides A-D resulting in a molding viscosity of 38 million Centipoise. A total of 0.45% carbon black particulate of is present. Upon cure of to form a 10 centimeter square flat planar panel through contact with a mold platen having a Diffracto analysis D number of 25, a panel was obtained having a Diffracto analysis D number of 95. The surface resistivity of this panel had an average value of $1.13 \times 10^6$ Ω/sq with a small variation across an array of 35 equally spaced radially points as shown as a dashed line in FIG. 1.

Comparative Examples

To determine the effectiveness of the composition of Example 1, a comparative sample (Comp. A) was prepared according to composition 1 of U.S. Pat. No. 6,001,919 with 0.8 total weight percent of the conductive carbon black particulate according to Example 1 and cured as a panel per Example 1. The surface resistivity of this panel had an average value of $1.2 \times 10^8$ Ω/sq with a considerably more variation across an array of 35 equally spaced radially points than observed for Example 1. This is shown as the line denoted with (x) in FIG. 1.

Four comparative formulations were prepared that varied relative to Example 1 in that 40 weight % of all the side D components was retained with the side A meaning that these formulations were not prepared in accordance with expression (I), and with the plot depicted in FIG. 1 as Comparative Examples B-E with (▲) also having 0.45 total weight percent carbon. The other samples depicted in FIG. 1 differed in the amounts of carbon black (♦) 0.52, (*) 0.60, and (■) 0.39 total weight percent carbon black. Higher average surface resistivity and inhomogenities are observed.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A molding compound formulation comprising:
   a thermoset cross-linkable unsaturated polyester;
   a isocyanate terminated polyurethane;
   an alkali metal oxide or an alkali metal hydroxide;
   a low profile additive; and
   a high surface area conductive carbon black particulate in an amount of between 0.3 and 3 weight percent of the formulation exclusive of fiber filler, said high surface area conductive carbon black particulate dispersed in at least one of said unsaturated polyester and said low profile additive to produce a cured panel having a surface resistivity value of between $1 \times 10^5$ Ω and $1 \times 10^8$ Ω, and a Diffracto analysis D number of less than 100 when cured against a mold platen having a Diffracto analysis D number of 25.

2. The formulation of claim 1, wherein said high surface area conductive carbon black particulate has a surface area of greater than 500 square meters per gram.

3. The formulation of claim 1, further comprising a fiber filler and nonconductive filler.

4. The formulation of claim 3 wherein said high surface area conductive carbon black particulate is present between 0.4 and 1 weight percent of the formulation exclusive of fiber filler.

5. The formulation of claim 1 wherein said high surface area conductive carbon black particulate is dispersed only in a side comprising said unsaturated polyester.

6. The formulation of claim 1 further comprising non-conductive particulate filler.

7. The formulation of claim 6 wherein said non-conductive particulate filler is calcium carbonate.

8. A panel comprising;
   a cured molding compound formulation of claim 1 having a shape and a surface having the surface resistivity; and
   a paint coating applied to the surface to yield a surface finish.

9. The panel of claim 8 wherein the surface finish is a class A finish having a Diffracto analysis D number of less than 100.

* * * * *